United States Patent

[11] 3,553,497

[72] Inventor William C. Smith
Los Gatos, Calif.
[21] Appl. No. 709,675
[22] Filed Mar. 1, 1968
[45] Patented Jan. 5, 1971
[73] Assignee Stewart-Warner Corporation
Chicago, Ill.
a corporation of Virginia

[54] BISTABLE FLIP-FLOP CIRCUIT WITH IMPROVED CONTROL OF CLOCK THRESHOLD

1 Claim, 4 Drawing Figs.

[52] U.S. Cl. .......... 307/291, 307/247, 307/292, 307/310
[51] Int. Cl. .......... H03k 3/12
[50] Field of Search .......... 307/291, 310, 247, 290, 292; 328/206

[56] References Cited
UNITED STATES PATENTS

| | | | |
|---|---|---|---|
| 3,247,399 | 4/1966 | Moody | 328/206 |
| 3,289,105 | 11/1966 | Funfstuck | 307/310 |
| 3,403,266 | 9/1968 | Heuner | 307/247 |
| 3,430,070 | 2/1969 | Marshall | 307/247 |

*Primary Examiner*—Donald D. Forrer
*Assistant Examiner*—David M. Carter
*Attorneys*—Augustus G. Douvas, William J. Newman and Norton Lesser

ABSTRACT: A bistable flip-flop circuit for use preferably in monolithic semiconductor integrated circuits having a master flip-flop at the circuit input and a slave output at the circuit output with coupling transistors between the two master and slave flip-flops. The emitters of the transistors coupled through a resistor to the clock pulse input so that the master flip-flop changes state responsive to the rise time of the clock pulse and the slave flip-flop changes state during the fall time of the clock pulse throughout an extended temperature range.

INVENTOR
William C. Smith

By William J. [illegible]
Attorney

INVENTOR
William C. Smith

By William J. Newman
Attorney.

BISTABLE FLIP-FLOP CIRCUIT WITH IMPROVED CONTROL OF CLOCK THRESHOLD

Bistable electronic circuits are important in the electronic control and computer parts because they can serve as memory devices which store information in digital mode. They have many applications in shift registers, pulse counters, etc., because of capability to have information shifted into and out at extremely rapid rates. To function properly and reliably, they must be capable of having their stored information read out and new information read in accurately without any confusion between the output and the input information.

Flip-flop circuits have therefore been developed, each of which include a master flip-flop at its input, a slave flip-flop at its output, the two being electronically coupled so that the master flip-flop changes its state responsive to the beginning of an input pulse and the slave flip-flop operates responsive to the changes of the master flip-flop and the end of the input pulse. Problems have been encountered with such circuits, however, in separating the changes of state of the two flip-flops, especially when the circuits are subjected to high temperature ambient conditions.

It is an object of this invention to provide a flip-flop circuit in which there is adequate separation of the information read in from the information read out over an extended temperature range.

The invention may best be understood by a further reading of this specification taking in account the attached drawings in which.

CIRCUIT DESCRIPTION

Figure 1:
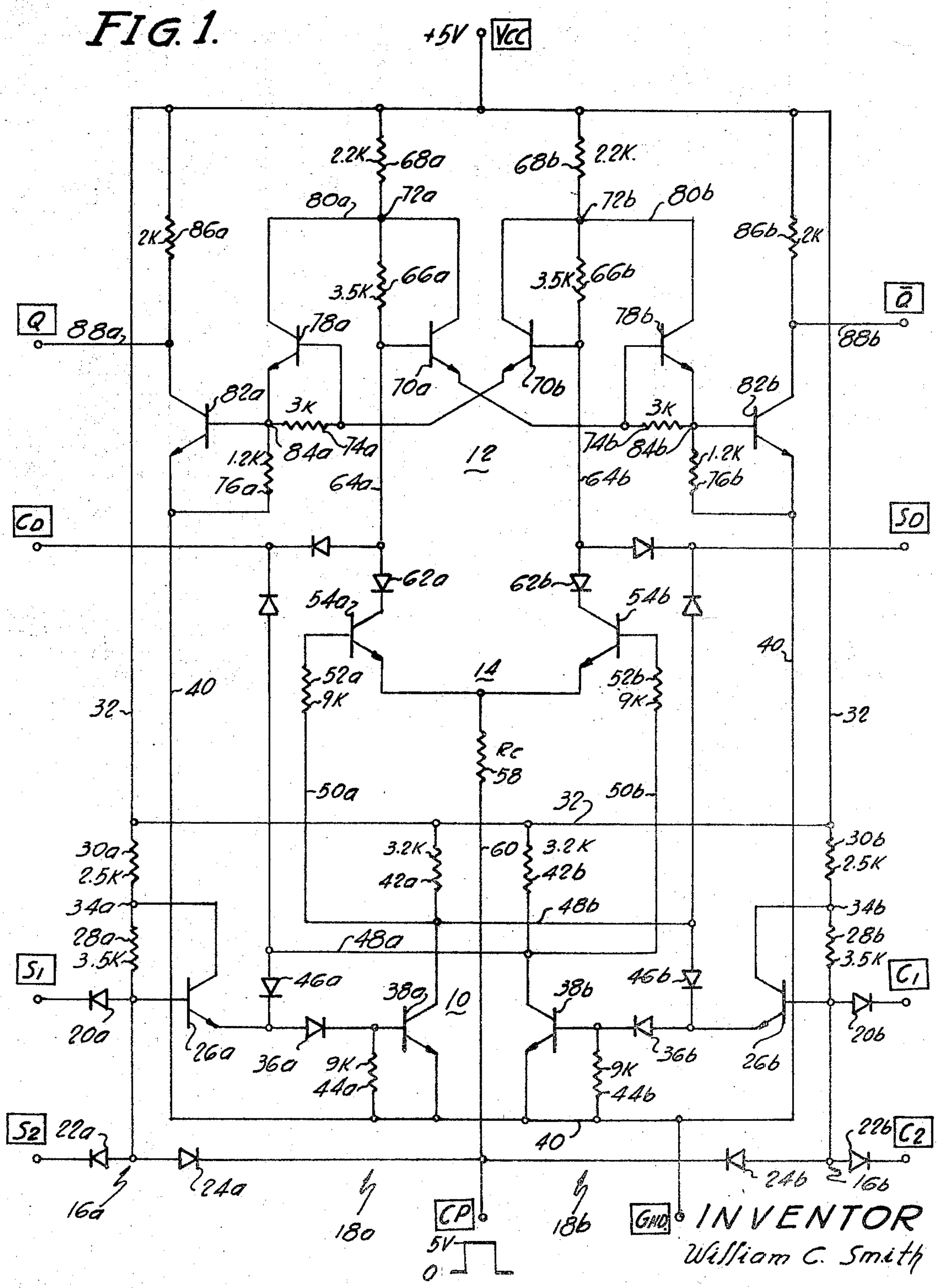
FIG. 1 is a schematic diagram of a bistable flip-flop circuit of the type designed especially for use in monolithic integrated circuits and embodying the teachings of this invention.

The circuit of FIG. 1 comprises a master flip-flop 10 at the bottom of the schematic and a slave flip-flop 12 in the upper portion of the circuit. The master 10 controls the operation of the slave 12 through the coupling circuit 14 between the two flip-flops.

The inputs to the circuit comprise the AND gates 16*a*, 16*b* which drive the master flip-flop 10 and the clock pulse terminal CP, while the circuit outputs marked Q and $\overline{Q}$ comprise the output of the slave flip-flop 12 as will be described hereinafter. It will be noted that the circuit is made up of two halves 18*a*, 18*b*, each of which are known essentially as mirror images of each other about an imaginary line drawn from the voltage source terminal marked $V_{cc}$ and the terminal CP. Thus, in applying reference numerals to the various components of the circuit, components having like functions will be given the same numeric reference symbol followed by the letter *a* or *b*, depending on its position in the right or left portion of the circuit.

The AND gate inputs 16*a*, 16*b* each comprise a set of three diodes 20*a*, 22*a*, 24*a* and 20*b*, 22*b*, 24*b*. The cathodes of diodes 24*a* and *b* are connected to the terminal CP which is adapted to receive the clock pulses from a clock source not shown. The other AND gate diodes have their cathodes connected to respective terminals S1, S2, C1 and C2 which may be connected to any desired signal source required for the control of the circuit function, or they may be left unconnected. The anodes of each of the AND gate diodes are connected to the bases of the respective AND gate transistors 26*a* and *b* which are connected as emitter followers. The bases of the AND gate transistors are also connected through series connecter resistors 28*a* and *b*, 30*a* and *b* to conductor 32 which through terminal $V_{cc}$ is connectable to a positive DC voltage source not shown. The collectors of transistors 26*a*, 26*b* are connected to respective junctions 34*a*, 34*b* between the series connected resistors so that the transistors 26*a*, 26*b*, when conducting, are self-controlling so as not to go into saturation. The outputs of the AND gate emitter follower transistors are taken across resistors 44*a*, 44*b*, series connected with diodes 36*a*, 36*b* between the transistor emitter and ground. These outputs feed the respective bases of master flip-flop transistors 38*a*, 38*b*.

Each of the master flip-flop transistors has its emitter connected directly to a ground conductor 40 and its collector connected through a respective load resistor 42*a*, 42*b* to the positive DC line 32. Feedback between the two master flip-flop transistors is provided through diodes 46*a*, 46*b* having their cathodes connected to the anodes of the diodes 36*a*, 36*b* and conductors 48*a*, 48*b* connecting the anodes of the diodes 46*a*, 46*b* to the collectors of the opposite transistors 38*b* and 38*a*, respectively. The output of the master flip-flop 10 is derived at the collectors of the flip-flop transistors 38*a*, 38*b* and transmitted via conductors 50*a*, 50*b* and resistors 52*a*, 52*b* to the bases of coupling transistors 54*a*, 54*b*.

The emitters of the coupling transistors are connected to each other by conductor 56 and to the clock pulse terminal CT through resistor 58 and conductor 60. The collectors of the coupling transistors are connected through respective diodes 62*a*, 62*b*, conductors 64*a*, 64*b*, resistors 66*a*, 66*b*, and resistors 68*a*, 68*b* to the positive DC conductor 32.

The slave flip-flop 12 is driven by the signals on conductors 64*a*, 64*b* which are connected to the respective bases of transistors 70*a*, 70*b*. The collectors of the slave flip-flop transistors 70*a*, 70*b* are connected to the junction 72*a*, 72*b* between the resistors 66*a*, 66*b* and resistors 68*a*, 68*b*. The emitters of transistors 70*a*, 70*b* are each connected to the ground conductor 40 through series connected resistors 74*a*, 74*b* and 76*a*, 76*b*.

The slave flip-flop also comprises transistors 78*a*, 78*b* which have their respective emitters and bases connected across respective resistors 74*a*, 74*b*. The collectors of these transistors are each connected to the positive DC conductor 32 through conductors 80*a*, 80*b*, junctions 72*a*, 72*b* and resistors 68*a*, 68*b*.

Transistors 82*a*, 82*b* provide the outputs for the circuit and each have their bases connected to the respective junction 84*a*, 84*b* between the series connected resistors 74*a*, 74*b* and 76*a*, 76*b*. The emitters of output transistors 82*a*, 82*b* are connected directly to the ground conductor 40 while the collectors are connected to the DC power conductor 32 through respective resistors 86*a*, 86*b* and to the output terminals Q, $\overline{Q}$ via conductors 88*a*, 88*b*.

CIRCUIT OPERATION

For the purposes of the description of the circuit operation, it will be assumed that the circuit is initially in its $\overline{Q}$ condition in which a high positive voltage appears at terminal $\overline{Q}$ and a low voltage appears at terminal Q. This condition dictates that transistor 82*a* be conducting and transistor 82*b* not conducting. Transistors 82*a* and 78*a* are maintained in a saturated conduction state by current flow in the emitter circuit of slave flip-flop transistor 70*b* which was turned on by. Previous input signal to the circuit in a manner to be hereinafter described. Transistor 70*a*, on the other hand, is not conducting because its collector is current starved by the low resistance path to the ground line 40 from junction 72*a* through conductor 80*a*, and the saturation conducting transistors 78*a* and 82*a*.

During the quiescent state of the circuit, neither of the collectors of the coupling transistors 54*a* or 54*b* are conducting. The master flip-flop 10, however, is ordinarily in a stable state in which transistor 38*b* is conducting and transistor 38*a* is not conducting for the $\overline{Q}$ state. The high voltage at the collector of nonconducting transistor 38*a* holds transistor 38*b* in conduction through conductor 48*b*, diode 46*b* and diode 36*b*. Similarly, the low voltage at the collector of conducting transistor 38*b* maintains transistor 38*a* shut off through conductor 48*a*, diode 46*a* and diode 36*a*. The AND gate transistors 26*a*, 26*b* are also nonconducting during the quiescent state of the circuit.

As previously mentioned, the coupling transistors 54*a*, 54*b* are both nonconducting in the quiescent state. Transistor 54*b* is off because of its base connection through resistor 52*b* and conductor 50*b* to the collector of the saturated conducting master flip-flop transistor 38*b*. Transistor 54*a* is also off even though its base is connected through resistor 52*a* and conductor 50*a* to the high voltage at the collector of nonconducting master flip-flop transistors 38*a*. This is because the collector of transistor 54*a* is current starved in view of the shunting circuit from junction 72*a* through conductor 80*a* and saturated conducting transistors 78*a* and 82*a*, previously described as the means by which the slave flip-flop transistor 70*a* is maintained nonconducting.

To shift the circuit from its $\overline{Q}$ state, AND gate 16*a* must be satisfied by the simultaneous appearance of a positive voltage on each of the input terminals S1, S2 and CP. Alternatively, terminal S1 and/or terminal S2 may be left unconnected and the AND gate 16*a* will be satisfied merely by the appearance of a positive going clock pulse at terminal CP. The clock pulse is the time sequence controlling factor since it is required to satisfy the AND gates 16*a* and *b* as well as to actuate one or the other of the transistors in the coupling circuit 14, as will be hereinafter described.

The AND gate 16*a* will be satisfied when the voltage at the base of transistor 26*a* reaches a particular positive value to cause it to conduct sufficient current through the base of flip-flop transistor 38*a* to turn it on. The input voltage required to bring the transistor 26*a* to that level of conduction is termed the AND gate threshold voltage $V_{AGTH}$ and is measured at the CP terminal. Thus, $V_{AGTH}$ measures the point along the rise time of the clock pulse at which the master flip-flop 10 flips from one bistable state to the other.

The conduction of transistor 38*a* lowers the voltage on conductor 48*b* and, hence, at the base of transistors 38*b* causing it to turn off. The collector of transistor 38*b* rises to approximately three diode drops above ground and this rise also appears at the base of coupling transistors 54*b*. Transistor 54*b* does not conduct at this time, however, because its emitter is connected through conductor 56, resistor 58 and conductor 60 to the CP terminal at which the positive going clock pulse is still appearing.

Transistor 54*b* will remain nonconducting until the clock pulse begins to fall off and provide sufficient forward bias between the base and the emitter of transistor 54*b* for conduction. The conduction of transistor 54*b* drops the voltage at the base of slave flip-flop transistor 70*b* causing it to completely turn off when transistor 54*b* goes into saturation. When transistor 70*b* ceases conduction, transistors 78*a* and 82*a* stop conducting, thus removing the shunt from the collector circuit of the other slave flip-flop transistor 70*a*. Transistor 70*a* conducts and its emitter current forward biases transistors 78*b*, 82*b* which then provide a shunt between the ground conductor 40 and junction 72*b*. Since this shunt circuit conducts most of the current from junction 72*b* to ground, the collectors of flip-flop transistor 70*b* and coupling transistor 54*b* are current starved, causing them to turn off. The level to which the clock pulse voltage must fall to turn on the coupling transistor and hence flip the slave flip-flop is termed the clock pulse threshold $V_{CPTH}$.

The circuit is, hence, once again in a stable state low voltage appearing at the $\overline{Q}$ terminal connected to the collector of conducting output transistor 82*b* and high voltage appearing at the Q terminal connected to the collector of the nonconducting output transistor 82*a*.

Figure 2:
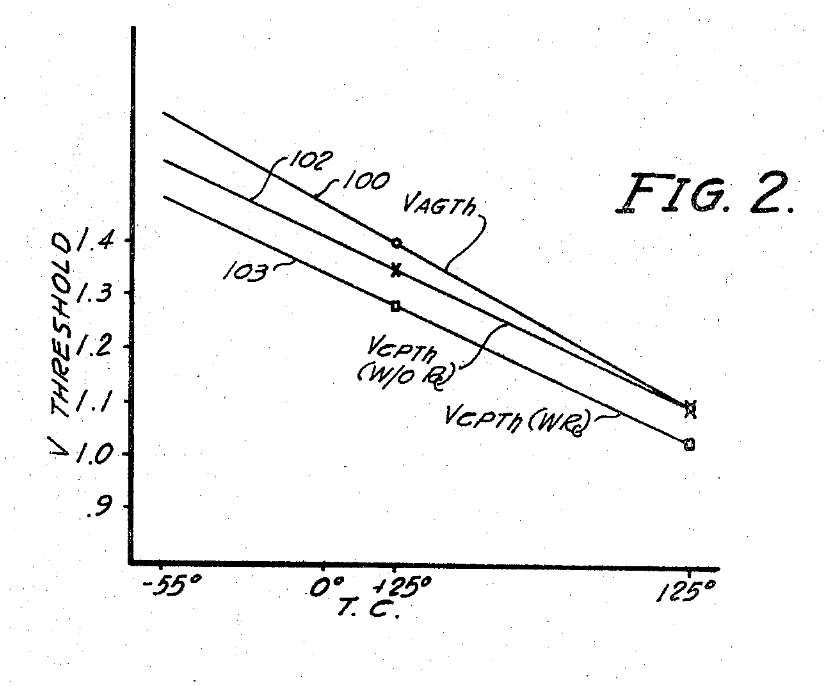
FIG. 2 is a graphic representation of the threshold voltages and their variations as a function of temperature.
Figure 3:
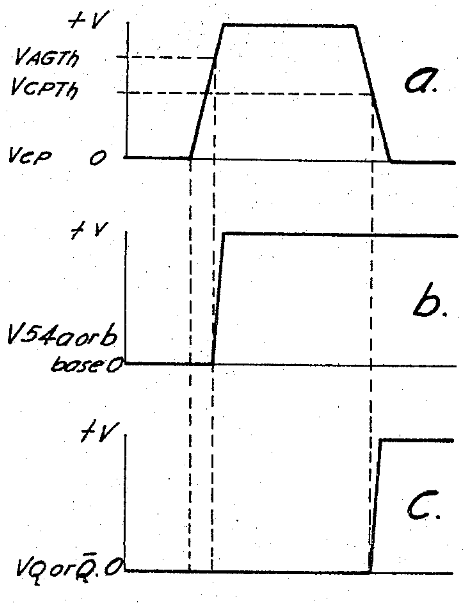
FIGS. 3 and 4 are graphic representatives of various waveforms in the circuit showing the effects on circuit operation when the threshold voltages are improperly separated.

One of the major problems with clock flip-flop circuits of this sort is that the threshold voltages $V_{AGTH}$ and $V_{CPTH}$ have a tendency to vary responsive to changes in ambient temperature to which the circuit is subjected. It may be seen in FIG. 2 that the threshold voltages tend to decrease with increasing temperatures as would be expected in the semiconductor devices. Furthermore, it may be seen from the $V_{AGTH}$ line marked 100 and the $V_{CPTH}$ line 102 that their rate of change with changing temperatures is not equal. Consequently, at the higher temperatures there is a tendency that the two threshold voltages approach each other and may even cross. The consequence of this phenomenon is that at the high temperatures the slave flip-flop 12 may be caused to change its state during the rise time of the clock pulse rather than as in the fall time during normal operation, which can cause great problems in the logic circuits to which they are applied. This might be better understood by a consideration of the waveforms shown in FIG. 3 and FIG. 4.

FIG. 3*a* depicts the voltage waveform for one clock pulse with the AND gate and clock pulse threshold voltages noted. As the voltage rises to the clock pulse threshold, it of course has no effect on the circuit because the master flip-flop 10 does not switch states until the AND gate threshold is reached. At the AND gate threshold, the master flip-flop 10 switches state and a positive voltage appears at the base of one of the coupling transistors, as shown in FIG. 3*b*. The coupling transistor does not conduct, however, since the clock pulse voltage is higher than the clock pulse threshold voltage. The slave flip-flop 12 is, therefore, still not affected. However, when the clock pulse during its fall time reaches the clock pulse threshold voltage, the coupling transistor becomes forward biased and switches the slave flip-flop 12 to its opposite state as represented by the waveform in FIG. 3*c*.

Figure 4:
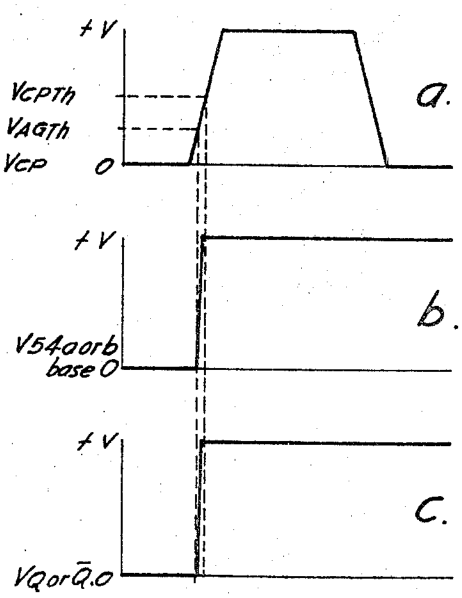

Consider now the waveforms of FIG. 4 which represent a high temperature condition (with exaggeration) at which the AND gate threshold voltage is lower than the clock pulse threshold voltage. As the clock pulse begins to rise and reaches the AND gate threshold, the master flip-flop 10 changes state and places a high voltage on the coupling transistor as shown in FIG. 4*b*. Since the clock pulse voltage is still below the clock pulse threshold, the coupling transistor becomes forward biased and thus conducts to cause the slave flip-flop 12 to switch states immediately during the rise time of the clock pulse as shown in FIG. 4*c*.

The present circuit eliminates this problem for extended temperature ranges by the incorporation of resistor 58 in the connection between the clock pulse terminal CP and the emitters of the coupling transistors 54*a*, 54*b*. This resistor has the effect of lowering the $V_{CPTH}$ versus temperature function as shown at 103 in FIG. 2. Thus, the two threshold voltages are far enough removed over an extended temperature range that the slave flip-flop 12 will not be caused to change states responsive to the rise time portion of the clock pulse or by noise on the clock pulse line of normally contemplated amplitude levels. The magnitude of resistance 58 is of course governed by the values of the other circuit components and circuit parameters. For a passivated, monolithic epitaxial silicon integrated circuit having the component values shown in FIG. 1, it was found that a 400 ohm resistance showed the $V_{CPTH}$ characteristics approaching the line 103 in FIG. 2, whereas without the resistance $V_{CPTH}$ had a characteristic represented by line 102 with the AND gate threshold $V_{AGTH}$ being represented in both cases approximately by the line 100. It has been found that resistance values for resistor 58 as low as 160 ohms improve the threshold characteristics by a substantial amount.

While there has been described a preferred embodiment of the invention, it is understood that modifications and additions may be made thereto without deviating from the teachings of this invention. It is, therefore, intended to be limited only by the scope of the appended claims.

I claim:

1. A bistable memory circuit having an output changeable from one stable state to its opposite stable state responsive to pulses received at its input from a pulse source comprising a master flip-flop coupled to said input and having a pair of oppositely oriented signal outputs, said master flip-flop operable responsive to the leading edge of said pulses to change its state, a slave flip-flop coupled to said circuit output and having a pair of oppositely oriented signal inputs, a first coupling transistor having its base coupled to one of said master outputs and its collector coupled to one of said slave inputs and operable responsive to said master flip-flop assuming one of its states to conduct to cause said slave flip-flop to assume one state, a second coupling transistor having its base coupled to the other of said master flip-flop outputs and its collector connected to the other of said slave inputs and operable responsive to said master flip-flop assuming its opposite state to conduct to cause said slave flip-flop to assume its opposite state, means responsive to the change of state of said slave flip-flop for rendering said coupling transistors nonconductive, and a fixed resistance connecting the emitters of said coupling transistors to said pulse source, said resistance having a value to insure that said coupling transistors begin conducting responsive only to the lagging edge of said pulses over the range of expected ambient temperatures.